(12) United States Patent
Imoto

(10) Patent No.: US 9,207,889 B2
(45) Date of Patent: Dec. 8, 2015

(54) INFORMATION PROCESSING APPARATUS, INFORMATION PROCESSING METHOD, AND STORAGE MEDIUM

(75) Inventor: Takashi Imoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 13/437,388

(22) Filed: Apr. 2, 2012

(65) Prior Publication Data

US 2012/0257242 A1 Oct. 11, 2012

(30) Foreign Application Priority Data

Apr. 6, 2011 (JP) ................................ 2011-084654

(51) Int. Cl.
*G06K 15/00* (2006.01)
*G06F 3/12* (2006.01)
*G06F 21/10* (2013.01)
*G06F 21/60* (2013.01)

(52) U.S. Cl.
CPC ............ *G06F 3/1222* (2013.01); *G06F 3/1238* (2013.01); *G06F 21/10* (2013.01); *G06F 21/608* (2013.01); *G06F 3/1239* (2013.01); *G06F 3/1267* (2013.01)

(58) Field of Classification Search
None
See application file for complete search history.

(56) References Cited

U.S. PATENT DOCUMENTS

| 8,325,363 | B2 * | 12/2012 | Kudo | 358/1.15 |
| 8,699,049 | B2 * | 4/2014 | Sugiyama | 358/1.14 |
| 2004/0105117 | A1 * | 6/2004 | Honda et al. | 358/1.14 |
| 2005/0179944 | A1 * | 8/2005 | Gassho et al. | 358/1.16 |
| 2006/0133842 | A1 * | 6/2006 | Obata et al. | 399/82 |
| 2009/0195825 | A1 * | 8/2009 | Kudo | 358/1.15 |
| 2010/0253963 | A1 * | 10/2010 | Amano | 358/1.14 |

FOREIGN PATENT DOCUMENTS

| CN | 1908952 A | 2/2007 |
| JP | 2007-141100 A | 6/2007 |
| JP | 2008-077499 A | 4/2008 |

* cited by examiner

*Primary Examiner* — Marcus T Riley
(74) *Attorney, Agent, or Firm* — Canon USA, Inc., I.P. Division

(57) ABSTRACT

An information processing apparatus and method includes determining whether print data is limited in a number of times of printing, determining whether a setting of storing the print data in the information processing apparatus is valid, and stopping transmission of the print data in a case where it is determined that the print data is limited in the number of times of printing and it is determined that the setting is valid.

15 Claims, 9 Drawing Sheets

FIG.5A

PRINTING CANNOT BE CONTINUED BECAUSE "SETTING OF STORING PRINT DATA" IS VALID.

PLEASE INVALIDATE THE SETTING.

PRINTING WILL BE CANCELLED BECAUSE FILE PORT IS SPECIFIED.

PRINTING CANNOT BE CONTINUED BECAUSE "SETTING OF STORING PRINT DATA" IS VALID.

PLEASE INVALIDATE THE SETTING OR PRESS "CANCEL PRINTING" BUTTON.

CANCEL PRINTING

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a program.

2. Description of the Related Art

For printing of a fee-based content (image data) such as a copyrighted material, some printing systems allow a user who pays a fair price for the content to print the content only the number of times corresponding to the paid price. Further, there are charging systems that allow a user to print data as long as the number of printed sheets or the number of times of printing is within the limitation corresponding to a price paid by the user.

Generally, such a printing system prevents a user from printing more than the limited number of sheets or the limited number of times of printing. For example, a possible method for realizing this prevention is to prepare a special application to manage limitation information and printing history information by this special application, and cause the special application to no longer allow printing of a fee-based content (image data) once the number of times of printing or the number of printed sheets exceeds the limitation.

Further, instead of preparing a special application, there is proposed a system of using a printer driver to maintain the limitation information and the print history information and prohibit a printing operation upon exceedance of a limitation, such as the technique discussed in Japanese Patent Application Laid-Open No. 2007-141100.

On the other hand, as a function of storing print data generated by a printer driver into an information processing apparatus when data is printed via a general-purpose application, there are provided the function of "outputting the data to a file" and the function of "saving the document after printing".

The function of "outputting the data to a file" is a function for enabling print data generated by a printer driver to be stored in a file without any change made thereto by outputting the data to a port called a "file port" without transmitting the data to a printing apparatus. The file generated by this function "outputting the data to a file" is print data interpretable by the printing apparatus. Therefore, use of a general-purpose application capable of transmitting the generated file to the printing apparatus allows the data to be printed by the printing apparatus without an intervention of, for example, the special application or the printer driver.

On the other hand, the function of "saving the document after printing" is a function of an operation system for saving print data generated by a printer driver in an information processing apparatus even after the data is printed by a printing apparatus. This function "saving the document after printing" allows the print data saved in the information processing apparatus to be reused. Also in this case, the data can be transmitted to the printing apparatus without an intervention of the special application or the printer driver.

However, even with a mechanism for limiting the number of times of printing or the number of printed sheets and preventing data from being printed beyond the limitations as mentioned above, a user can print data as much as the user wants without being affected by the limitation, by utilizing the function of "outputting the data to a file" or "saving the document after printing".

In other words, print data generated within the limitation imposed by the special application and the printer driver is stored in the information processing apparatus by the printing system that can operate beyond the control of the special application and the printer driver as mentioned above. This stored print data can be transmitted to the printing apparatus without an intervention of the special application or the printer driver, and, therefore, the print data can be printed by the printing apparatus as much as a user wants without being subject to the limitation by the special application and the printer driver.

On the other hand, normally, these functions for storing print data are independently managed by the printing system, which is in charge of the entire print control, with use of the operation system. The printing system receives a print request from various applications, and generates print data by requesting the printer driver assigned to the specified printing apparatus to generate the print data. This is the same at the time of storing print data, and the special application and the printer driver do not involve the processing of storing print data. Therefore, even if a system is configured to manage the limitation information, no disclosure is provided about a method for preventing data from being printed by the printing apparatus as much as a user wants.

SUMMARY OF THE INVENTION

One aspect of the present invention is directed to a technique of, for printing of content limited in the number of times of printing or the number of printed sheets, preventing print data of the content from being stored in an information processing apparatus, thereby maintaining the limitation.

According to an aspect of the present invention, an information processing apparatus includes a memory and a processor coupled to the memory, where the processor controls a number of times of printing limitation determination unit configured to determine whether print data is limited in a number of times of printing, a setting determination unit configured to determine whether a setting of storing the print data in the information processing apparatus is valid, and a transmission control unit configured to stop transmission of the print data in a case where the number of times of printing limitation determination unit determines that the print data is limited in the number of times of printing and the setting determination unit determines that the setting is valid.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C each illustrate an example of information displayed to be reported to a user according to the first exemplary embodiment.

DESCRIPTION OF THE EMBODIMENTS

Various exemplary embodiments, features, and aspects of the invention will be described in detail below with reference to the drawings.

Figure 1:
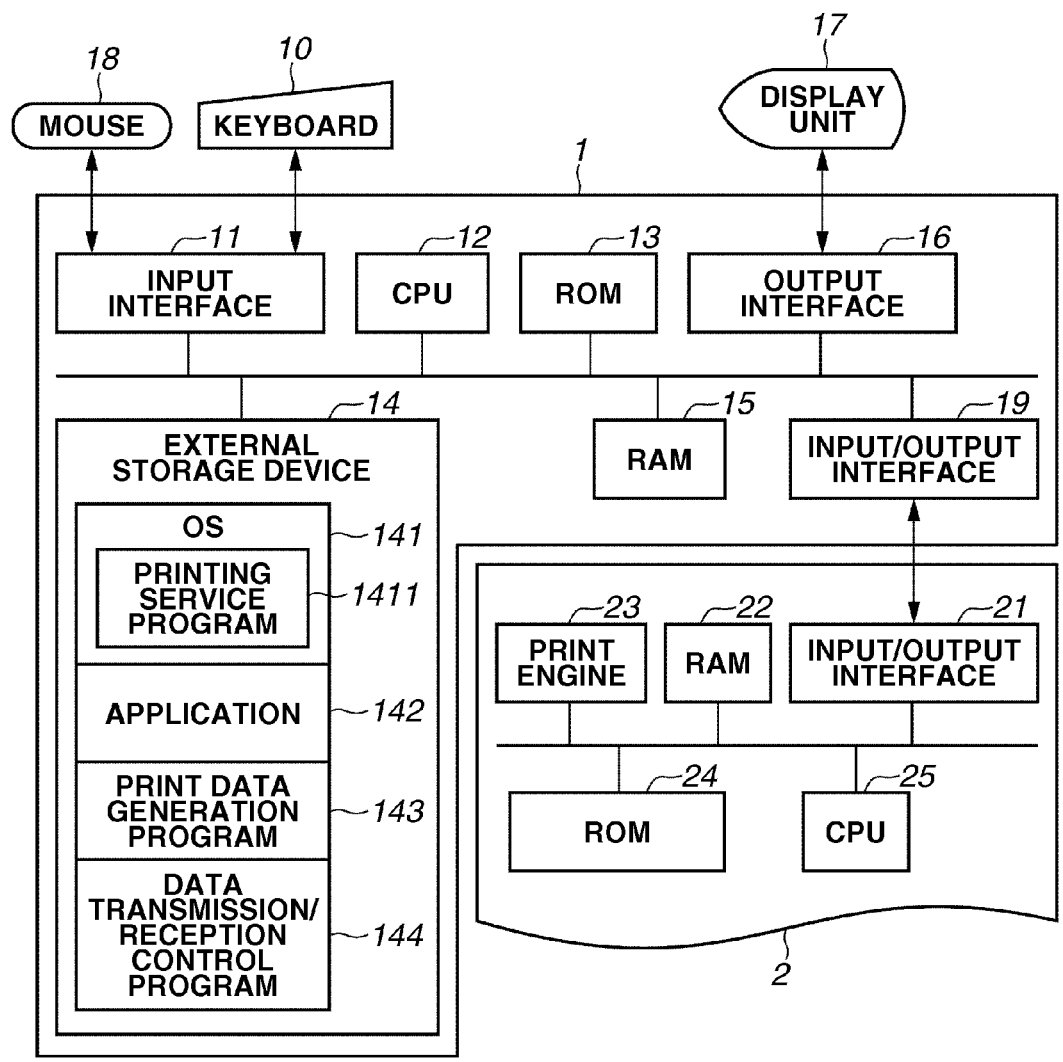
FIG. 1 is a block diagram illustrating an example of a printing system according to exemplary embodiments of the present invention.

FIG. 1 is a block diagram illustrating an example of a printing system according to exemplary embodiments of the present invention. The printing system according to the exemplary embodiments of the present invention includes a printer 2, and a host computer 1 connected to the printer 2. The host computer 1 is an example of an information processing apparatus (computer). The printer 2 is an example of a printing apparatus.

The host computer 1 includes an input interface 11, a central processing unit (CPU) 12, a read only memory (ROM) 13, an external storage device 14, a random access memory (RAM) 15, an output interface 16, a display unit 17, a keyboard 10, a mouse 18, and an input/output interface 19.

The ROM 13 stores an initialization program, and the external storage device 14 stores an operating system (OS) 141. The OS 141 includes a printing service program 1411 in charge of print control. Further, the external storage device 14 stores an application 142, which provides a user with execution of printing, and a print data generation program 143, which generates print data interpretable by the printer 2. Further, the external storage device 14 stores various types of programs and OSs such as a data transmission/reception control program 144 for transmitting the generated print data to the printer 2 via the input/output interface 19, and various types of data to be used by these programs. The CPU 12 executes processing based on the various types of programs stored in the external storage device 14, by which the functions of the host computer 1 and the processing of flowcharts which will be described below are realized. Hereinafter, for simplification of description, the exemplary embodiments of the present invention will be described as if the programs, instead of the CPU 12, perform the processing.

The printer 2 includes an input/output interface 21, a RAM 22, a print engine 23, a ROM 24, and a CPU 25. The input/output interface 21 is connected to the input/output interface 19 of the host computer 1. The connection interface therefor may be embodied by, for example, a universal serial bus (USB), a local area network (LAN), and other various types of interfaces, but may be embodied by any type of connection interface.

The RAM 22 is used as a main memory and a work memory for the CPU 25. The RAM 22 stores a receiving buffer, which temporarily stores received print data, and various types of data. The print engine 23 performs a printing operation based on the data stored in the RAM 22.

The ROM 24 stores various types of control programs and data to be used by the control programs. The CPU 25 controls the respective units of the printer 2 according to these control programs.

In the exemplary embodiments of the present invention, the host computer 1 and the printer 2 are in charge of the respective processes and functions in the above-described manner, but this is merely an example. Which apparatus is in charge of each process and each function may be defined not only in the above-described manner but also in another manner.

Next, a print control flow will be described. When a user performs a print operation via the application 142, the application 142 notifies the printing service program 1411 of the print request. At this time, the application 142 also notifies the printing service program 1411 of drawing information including image data and character information such as a fee-based content to be printed, and print setting information such as a paper size and a layout, together with the print request.

Upon receiving the print notification, the printing service program 1411 generates a print job, and starts print control processing. The print job is a conceptual unit in the print control performed by the host computer 1 and the printer 2, and the print control performed by the host computer 1 and the printer 2 is managed based on a print job as a unit.

The printing service program 1411 requests the print data generation program 143 to generate print data, and the data transmittance/reception control program 144 to transmit the generated print data, respectively. Then, upon completion of the generation and transmission of all of print data blocks, the printing service program 1411 deletes the print job, and ends the print control.

The print data is generated by converting the drawing information and the print setting information provided from the application 142 into data in a format allowing the printer 2 to interpret the data. The printer 2 executes print processing based on this print data.

Normally, it is time-consuming to generate print data and transmit the generated print data to the printer 2. Therefore, generally, whole print data is not generated and transmitted by one operation, but is generated and transmitted by multiple divided operations. In the generation of print data, print data is generated for a part of drawing information, and the generated print data is stored. Then, print data is generated for a subsequent part of the drawing information, and the generated print data is stored. Similarly, in the transmission of print data to the printer 2, a part of the stored print data is transmitted. After the previous transmission is completed, a subsequent part of the print data is transmitted. Further, in many cases, parallel processing is employed to generate print data and transmit the print data to the printer 2 simultaneously, thereby reducing the processing time as a whole.

Next, the print control flow will be described with reference to FIG. 2. When a print job is generated and the printing service program 1411 starts print control, in step S101, the printing service program 1411 checks a print data generation status from print data management information (not illustrated). The print data management information is information indicating, for example, the status of print data generation and the status of transmission to the printer 2. The printing service program 1411 can determine, for example, whether all of print data blocks (hereinafter referred to as "all print data blocks") have been generated for the print job that the printing service program 1411 is currently processing, until which portion of the drawing information the generation of print data has been completed for, and which print data block has been already transmitted to the printer 2 or which print data block has not been transmitted to the printer 2 yet by checking the print data management information. If the printing service program 1411 determines that all print data blocks have already been generated (YES in step S101), the processing proceeds to step S104. If the printing service program 1411 determines that the generation has not yet been completed for of all print data blocks (NO in step S101), the processing proceeds to step S102. In step S102, the printing service program 1411 provides a part of the drawing information received from the application 142 to the print data generation program 143, and requests the print data generation program 143 to generate print data. The print data generation program 143 generates print data from the provided drawing information and print setting information, and notifies the printing service program 1411 of the generated information. In step S103, the printing service program 1411 stores the generated print data in the external storage device 14 or the RAM 15, and updates the print data management information.

In step S104, the printing service program 1411 checks whether there is a request for cancellation of printing from a user or another program. If the printing service program 1411 determines that there is a request for cancellation of printing (YES in step S104), the processing proceeds to step S111. If there is no request for cancellation of printing (NO in step S104), the processing proceeds to step S105. In step 105, the printing service program 1411 checks the status of transmission of print data from the above-described print data management information. If the printing service program 1411 determines that transmission has not yet been completed for all the print data blocks (NO in step S105), the processing proceeds to step S106, in which the printing service program 1411 provides the data transmission/reception control program 144 with unsent print data in the stored print data, and requests the data transmission/reception control program 144 to transmit the provided data to the printer 2.

In steps S201 and S202, the data transmission/reception control program 144 transmits the provided print data to the printer 2 via the input/output interface 19. The data transmission/reception control program 144 analyzes the print data provided from the printing service program 1411, and acquires the status information of the printer 2 from the printer 2 via the input/output interface 19 to manage the printer 2 and control the transmission of the print data. This status information acquired from the printer 2 includes, for example, the operating status and the error information of the printer 2, device status information indicating, for example, the remaining amount of a consumable, and job status information of a print job that the printer 2 receives.

In step S203, while performing the above-described processes, the data transmission/reception control program 144 transmits the provided print data to the printer 2, notifies the printing service program 1411 of the data amount that the data transmission/reception control program 144 has successfully transmitted, and then ends the processing.

Upon receiving a transmission completion notification from the data transmission/reception control program 144 in step S107, the printing service program 1411 updates the print data management information. If the data transmission/reception control program 144 notifies the printing service program 1411 that the number of transmitted data blocks is zero in step S203, the printing service program 1411 does not update the transmission information of the print data management information, and requests the data transmission/reception control program 144 to start with transmission of the print data that has failed to be transmitted in the next transmission request.

In step S108, the printing service program 1411 checks again whether there is a request for cancellation of printing. If the printing service program 1411 determines that there is no request for cancellation of printing in step S108 (NO in step S108), the processing proceeds to step S101 again. In step S101, the printing service program 1411 causes remaining print data blocks to be generated and transmitted to the printer 2.

If there is a request for cancellation of printing in step S104 or S108 (YES in step S104 or S108), the printing service program 1411 starts printing cancellation processing. In step S111, the printing service program 1411 deletes the print data stored in step S103, and ends the print control.

On the other hand, if the printing service program 1411 determines that all the print data blocks have been transmitted in step S105 (YES in step S105), the processing proceeds to step S109. In step S109, the printing service program 1411 checks whether "a setting of storing print data" is valid or invalid. The status that "the setting of storing print data" is valid means, for example, that the function of "outputting the data to a file" or "saving the document after printing" described above in the section "Description of the Related Art" is set to be valid.

If the printing service program 1411 determines that "the setting of storing print data" is valid in step S109 (YES in step S109), the printing service program 1411 ends the print control without performing further processing. In this case, since the generated print data is not deleted, the print control is ended in such a state that all the print data blocks remain in the external storage device 14 or the RAM 15.

On the other hand, if the printing service program 1411 determines that "the setting of storing print data" is invalid in step S109 (NO in step S109), the processing proceeds to step S110, in which the printing service program 1411 deletes all the generated print data blocks, and then ends the print control.

Figure 2:
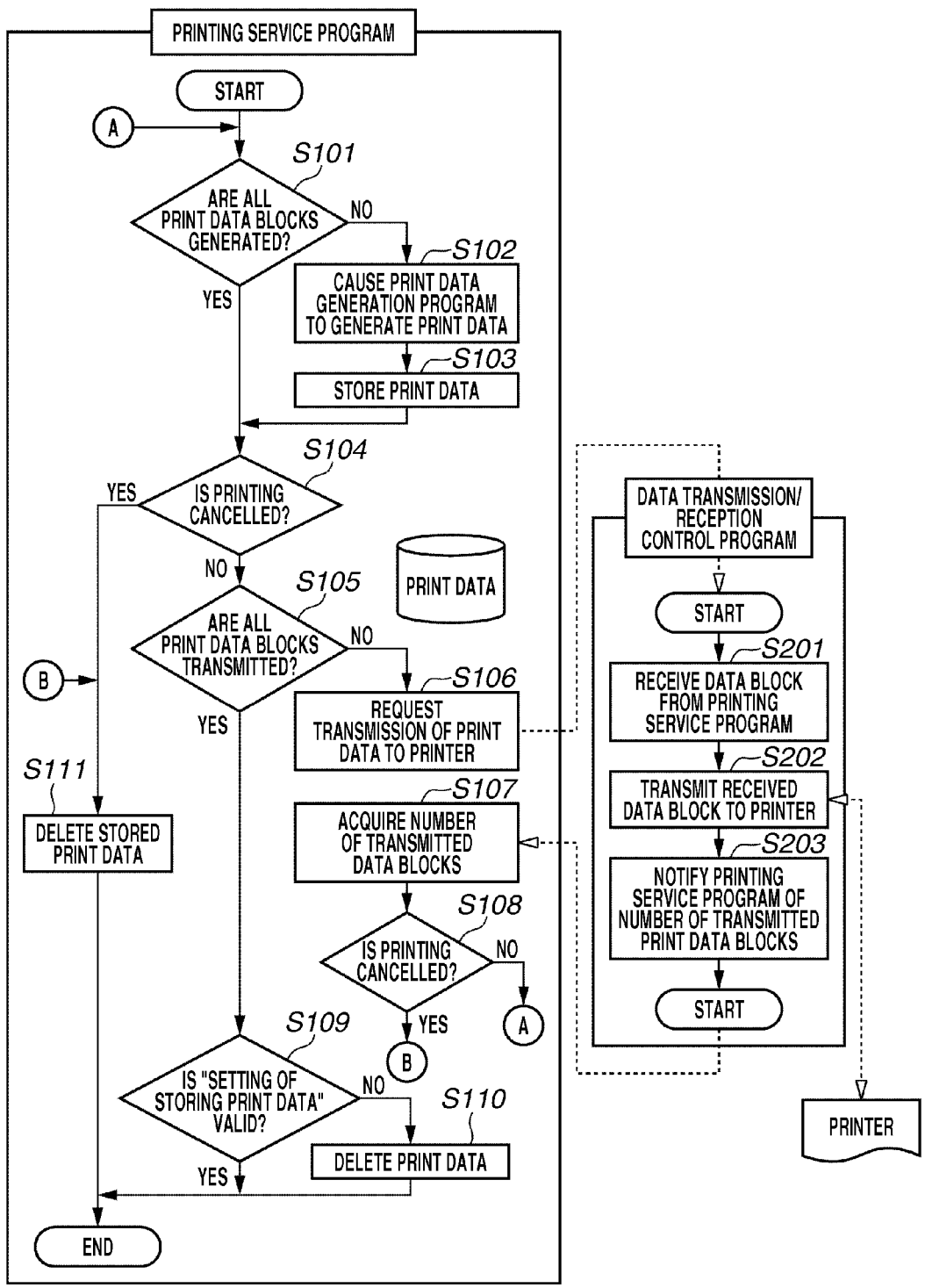
FIG. 2 is a flowchart illustrating print control performed by the printing system.

In FIG. 2, the printing service program 1411 and the data transmission/reception control program 144 are in charge of the respective processes in the above-described manner, but this is merely an example of the printing system, and which program is in charge of each process does not need to be defined in the above-described manner.

Next, the printing system capable of preventing print data from being stored during printing of content limited in the number of times of printing or the number of printed sheets will be described.

Figure 3:
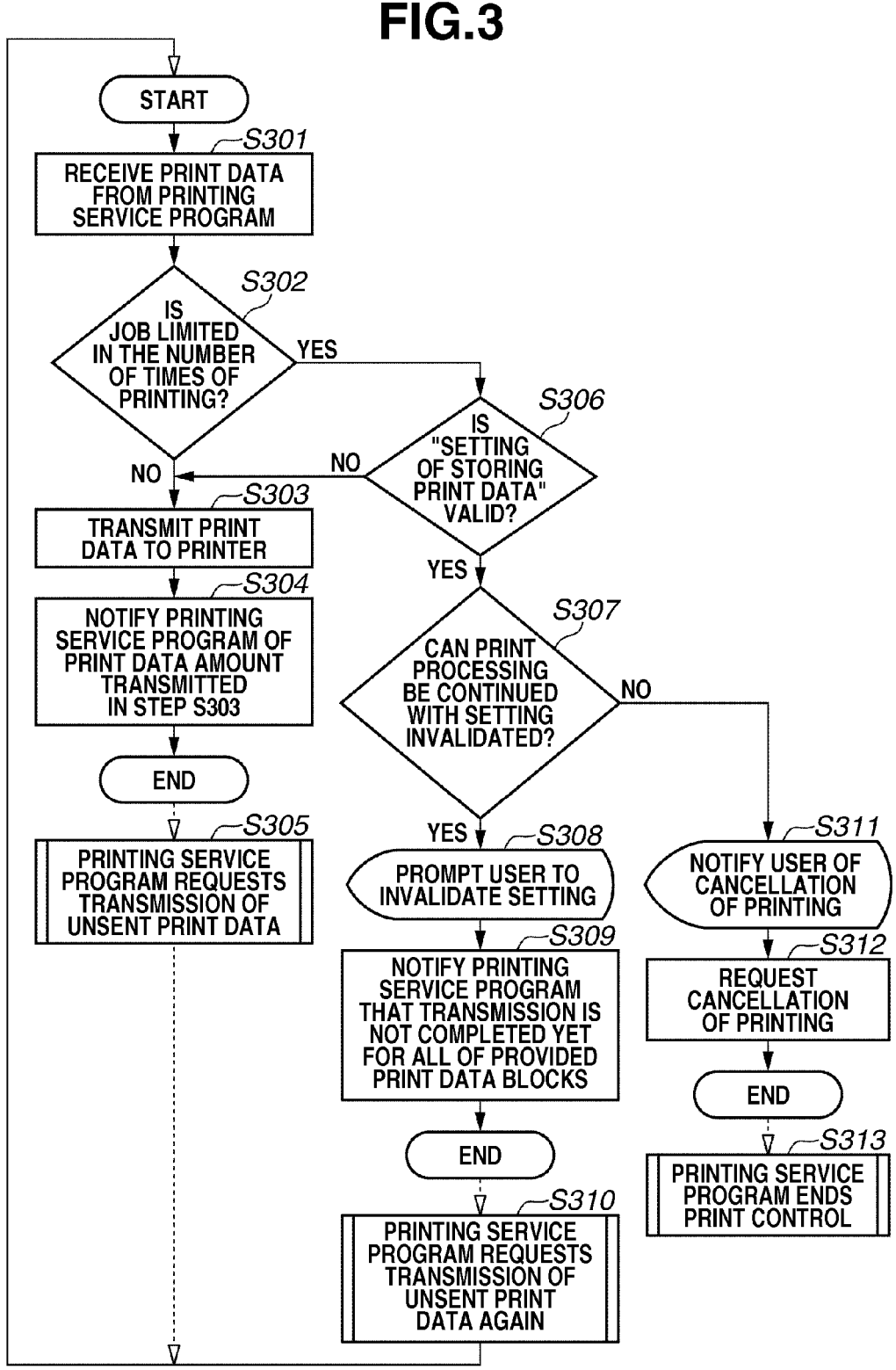
FIG. 3 is a flowchart illustrating transmission control and print control of print data according to a first exemplary embodiment of the present invention.

FIG. 3 is a flowchart illustrating print control performed by the data transmission/reception control program 144 according to a first exemplary embodiment of the present invention.

As described above with reference to FIG. 2, after the application 142 instructs execution of printing, the data transmission/reception control program 144 starts to operate upon receiving a notification of transmission of generated print data from the printing service program 1411.

After receiving the notification, in step S301, the data transmission/reception control program 144 receives the print data from the printing service program 1411. In step S302, the data transmission/reception control program 144 determines whether the print job that the data transmission/reception control program 144 is currently processing is a print job limited in the number of times of printing. The process of step S302 is an example of a process of determining whether there is a limitation in the number of times of printing.

Figure 4:
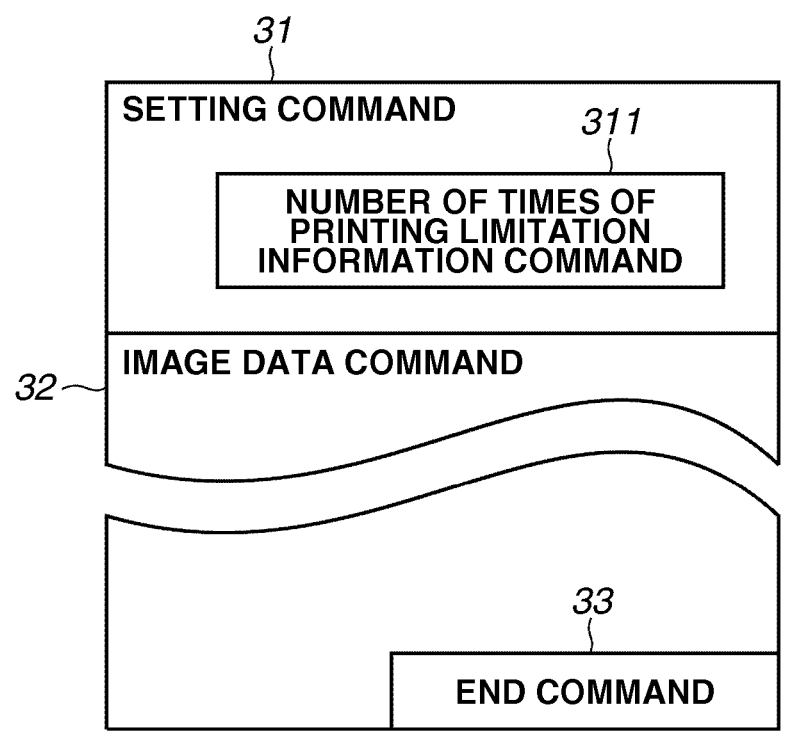
FIG. 4 illustrates an example of print data generated by a print data generation program.

The process of determining whether a print job is limited in the number of times of printing is described with reference to FIG. 4. FIG. 4 illustrates an example of whole print data of a print job which is generated by the print data generation program 143. The print data generated by the print data generation program 143 includes a setting command 31 specifying the size of a print medium or sheet on which the data is to be printed and a sheet feeding method, information such as an image data command 32 for printing an image by the printer 2, and an end command 33 indicating the end of the print data. The setting command 31 includes a number of times of printing limitation information command 311, which indicates whether the print data is limited in the number of times of printing. If the print job is limited in the number of times of printing, the print data generation program 143 embeds this information at the time of the print data generation described above with reference to FIG. 2. The print data generation program 143 determines whether to embed the number of times of printing limitation information command 311 according to, for example, an instruction from the application 142.

In step S302, the data transmission/reception control program 144 analyzes the print data received from the printing service program 1411 to determine whether this print job is limited in the number of times of printing from the number of times of printing limitation information command 311. In this way, in the present exemplary embodiment, the data transmission/reception control program 144 determines from the print data whether the print data is limited in the number of times of printing. In another exemplary embodiment, instead of making a determination in this manner, the data transmission/reception control program 144 may perform program-to-program communication with the application 142 or the print data generation program 143 to inquire whether the print job is limited in the number of times of printing, and make a determination according to the inquiry result.

If the print job is not limited in the number of times of printing (NO in step S302), then in step S303, the data transmission/reception control program 144 transmits the print data to the printer 2 without performing any special processing, and then in step S304, the data transmission/reception control program 144 notifies the printing service program 1411 of the print data amount that has been transmitted in step S303. Then, the process ends. If the data transmission/reception control program 144 has succeeded in transmitting all of the print data blocks received in step S301, the notified amount matches the received print data amount. In step S305, the printing service program 1411 requests the data transmission/reception control program 144 to transmit print data again, if there is still unsent print data, as illustrated in FIG. 2. The unsent print data means print data of the subsequent block, if the data amount provided in step S301 matches the data amount notified in step S304. On the other hand, if the data amount notified in step S304 is less than the data amount provided in step S301, the unsent print data means remaining print data blocks that the data transmission/reception control program 144 has failed to transmit. The printing service program 1411 repeats this processing until the data transmission/reception control program 144 completes the transmission of all the print data blocks.

If the data transmission/reception control program 144 determines that the print job is limited in the number of times of printing in step S302 (YES in step S302), the processing proceeds to step S306. In step S306, the data transmission/reception control program 144 checks whether "the setting of storing print data" is valid. The process of step S306 is an example of a process of determining the setting. For example, the data transmission/reception control program 144 determines that "the setting of storing print data" is valid if the type of a port for transmission (for example, USB or LAN) is a file port (the function "outputting the data to a file" described above in the section "Description of the Related Art"). Further, the data transmission/reception control program 144 may inquire the status of "the setting of saving a print job" to the OS 141 or the printing service program 1411, and determine whether "the setting of storing print data" is valid based on the inquiry result. In other words, the data transmission/reception control program 144 determines that "the setting of storing print data" is valid, if the inquiry result reveals that "the setting of saving a print job" is valid.

If the data transmission/reception control program 144 determines that "the setting of storing print data" is invalid in step S306 (NO in step S306), the processing proceeds to step S303, in which the data transmission/reception control program 144 transmits the print data to the printer 2.

If the data transmission/reception control program 144 determines that "the setting of storing print data" is valid in step S306 (YES in step S306), the processing proceeds to step S307. In step S307, the data transmission/reception control program 144 further checks whether "the setting of storing print data" can be invalidated. For example, if "the setting of storing print data" is based on the function "outputting the data to a file" (if the port type is set to a file port), the port should be changed to a port other than a file port to invalidate "the setting of storing print data". However, the port type cannot be changed during print processing, and therefore in this case, the data transmission/reception control program 144 determines that "the setting of storing print data" cannot be invalidated. On the other hand, if "the setting of storing print data" is based on the function "saving a job after printing", the setting can be invalidated during print processing, and therefore in this case, the data transmission/reception control program 144 determines that "the setting of storing print data" can be invalidated.

In step S307, if the data transmission/reception control program 144 can change "the setting of storing print data" and can still continue the print control (YES in step S307), the processing proceeds to step S308. Then, in step S308, the data transmission/reception control program 144 displays a message illustrated in FIG. 5A on the display unit 17, to prompt a user to invalidate "the setting of storing print data". Further, in step S309, the data transmission/reception control program 144 notifies the printing service program 1411 that the transmission of the print data is not completed yet, and then ends the processing. In response to this notification, the printing service program 1411 transmits the print data again. At this time, since "the setting of storing print data" is invalid, the print data is transmitted to the printer 2. Upon receiving the notification indicating that the transmission is not completed yet from the data transmission/reception control program 144, in step S310, the printing service program 1411 requests the data transmission/reception control program 144 to transmit the unsent print data again in the next transmission request. In other words, as long as "the setting of storing print data" is kept valid, the print data transmission processing cannot further advance, so that the printing service program 1411 cannot end the print control. As long as the print control cannot be ended, new print control cannot be started, which makes it impossible to read out the print data to reuse it.

On the other hand, if the data transmission/reception control program 144 determines that "the setting of storing print data" cannot be invalidated in step S307 (NO in step S307), the processing proceeds to step S311. In step S311, the data transmission/reception control program 144 displays a message illustrated in FIG. 5B on the display unit 17. Further, in step S312, the data transmission/reception control program 144 notifies the printing service program 1411 of cancellation of the print processing, and then ends the processing.

In step S313, when the printing service program 1411 is notified of the cancellation of the print processing, the printing service program 1411 deletes the stored print data, and ends the print control, as described above with reference to FIG. 2. Since no print data exists when the print control is ended, it is impossible to reuse the print data. The processes of S309, S310, S312, and S313 are examples of a process of stopping print processing.

In the first exemplary embodiment, the data transmission/reception control program 144 determines whether the processing can be continued in step S307, and provides the respective processes according to the determination result. Alternatively, even if the situation allows the processing to be continued, the data transmission/reception control program 144 may cancel the print processing. Further, in the first exemplary embodiment, the data transmission/reception control program 144 issues the notification to the user, but the data transmission/reception control program 144 may perform the respective processes without issuing any notification to the user.

Further alternatively, a method may be employed that the data transmission/reception control program 144 does not allow the print control to be ended until "the setting of storing print data" is invalidated or a request for cancellation of printing is issued while displaying a message illustrated in FIG. 5C, regardless of whether the processing can be continued in step S307. If "the setting of storing print data" is invalidated, the data transmission/reception control program 144 removes the message illustrated in FIG. 5C, and resumes the data transmission. If cancellation of printing is selected, the data transmission/reception control program 144 notifies the printing service program 1411 of the request for cancellation of printing. Then, the printing service program 1411 performs the printing cancellation processing as described above with reference to FIG. 2.

Figure 6:
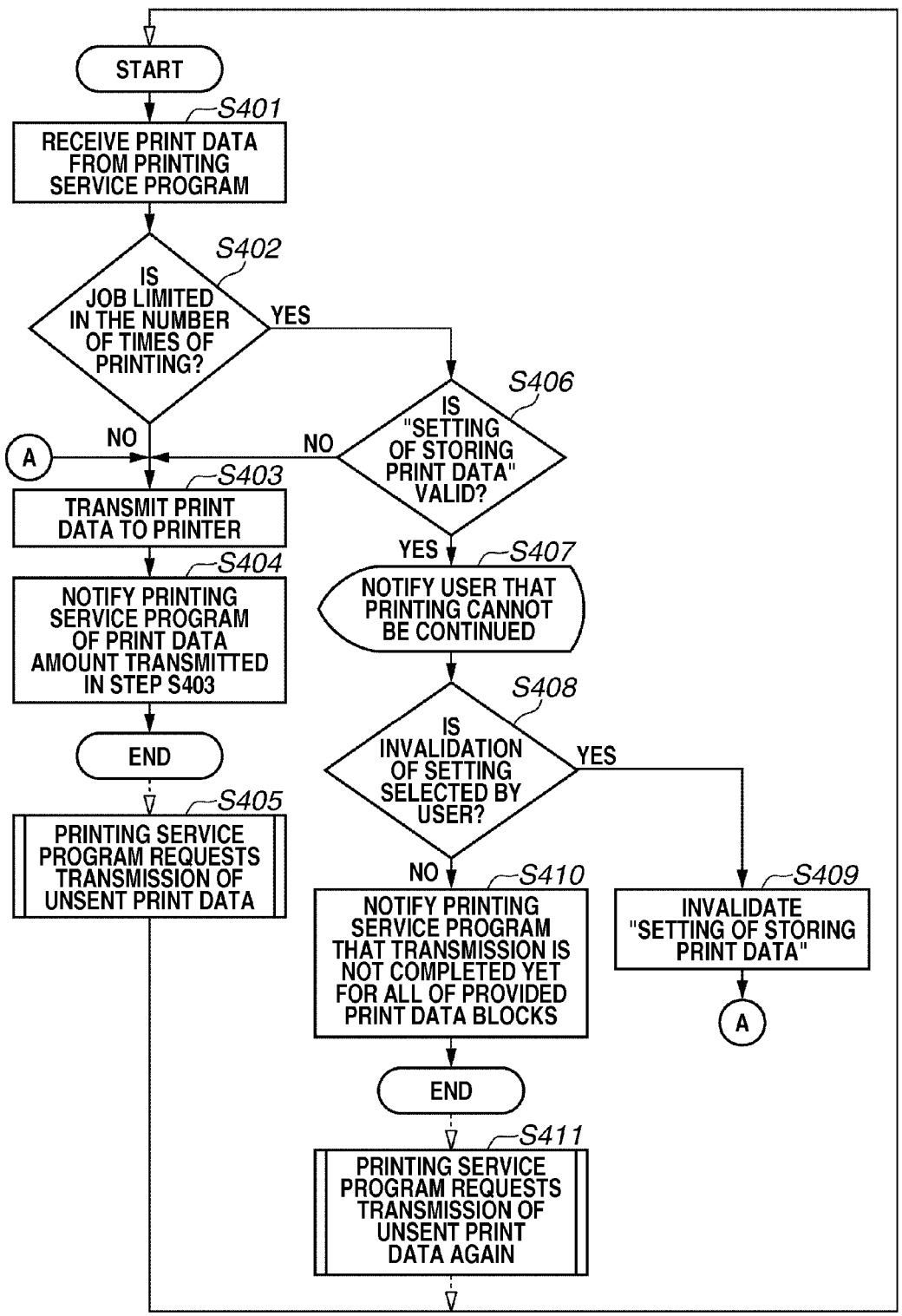
FIG. 6 is a flowchart illustrating transmission control and print control of print data according to a second exemplary embodiment of the present invention.

FIG. 6 is a flowchart illustrating print data transmission control and print control performed by the data transmission/reception control program 144 according to a second exemplary embodiment. In the first exemplary embodiment, the data transmission/reception control program 144 prompts a user to change "the setting of storing print data", and then the user operates the apparatus to invalidate "the setting of storing print data". The second exemplary embodiment is configured in such a manner that the data transmission/reception control program 144 invalidates "the setting of storing print data" to continue the print control.

First, in a case where the print job is not limited in the number of times of printing, or in a case where the print job is limited in the number of times of printing but "the setting of storing print data" is invalid, the processing (the steps from step S401 to step S406) proceeds in a similar manner to the flowchart of the first exemplary embodiment (the steps from step S301 to step S306).

Figure 7:
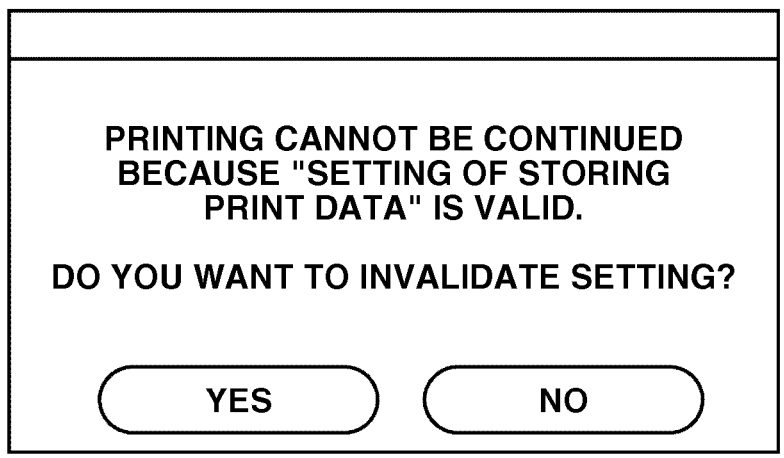
FIG. 7 illustrates an example of information displayed to be reported to a user according to the second exemplary embodiment.

If the print job is limited in the number of times of printing and "the setting of storing print data" is valid, in step S407, the data transmission/reception control program 144 displays a message illustrated in FIG. 7 on the display unit 17. The data transmission/reception control program 144 uses this message to notify a user that the print processing cannot be continued, and further in step S408, the data transmission/reception control program 144 uses this message to ask a user whether the user wants to invalidate "the setting of storing print data". If the data transmission/reception control program 144 confirms that invalidation of "the setting of storing print data" is selected by the user (YES in step S408), the processing proceeds to step S409. If invalidation of "the setting of storing print data" is not selected by the user (NO in step S408), the processing proceeds to step S410.

In step S409, the data transmission/reception control program 144 invalidates "the setting of storing print data", and the processing proceeds to step S403, by which the print processing can be continued.

If invalidation of "the setting of storing print data" is selected by the user in step S408, in the next transmission request, the processing proceeds to step S403 so that the print processing can be continued. On the other hand, if "the setting of storing print data" remains valid, the print control cannot further advance, and, therefore, cannot be ended. As a result, it becomes impossible to read out the print data to reuse it.

In the second exemplary embodiment, the data transmission/reception control program 144 provides the user with choices to keep "the setting of storing print data" valid or invalidate "the setting of storing print data". In addition, a button for cancellation of printing may be provided on the screen illustrated in FIG. 7, and the print processing may be canceled if the user selects cancellation of printing. Alternatively, the processes may be switched according to the selection whether to continue the print processing, as is the case with the first exemplary embodiment.

In the present exemplary embodiment, the invalidation of "the setting of storing print data" is performed by the data transmission/reception control program 144, so that it is possible to improve user's operability.

The first and second exemplary embodiments are configured in such a manner that the data transmission/reception control program 144 stops data transmission to the printer 2 before completion of the data transmission. Therefore, in the first and second exemplary embodiments, the printer 2 may have to stop the printing operation in the middle of the operation. The stop of data reception during the printing operation may lead to an occurrence of a printing failure such as color unevenness, or false detection of a communication error by the printer 2.

Figure 8A:
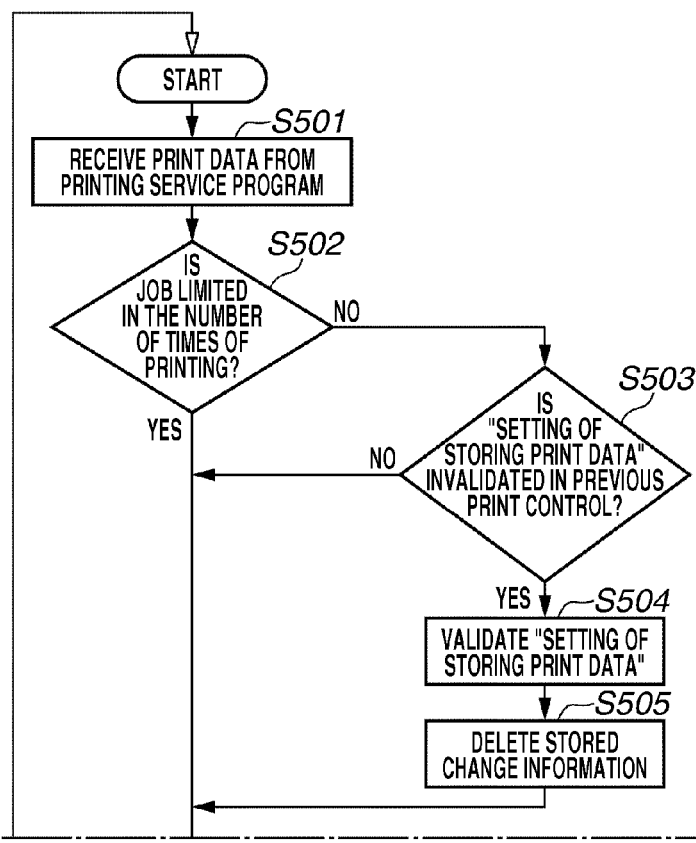
FIG. 8, which is composed of FIGS. 8A and 8B, is a flowchart illustrating transmission control and print control of print data according to a third exemplary embodiment of the present invention.
Figure 8A:
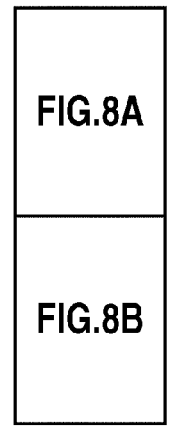
Figure 8B:
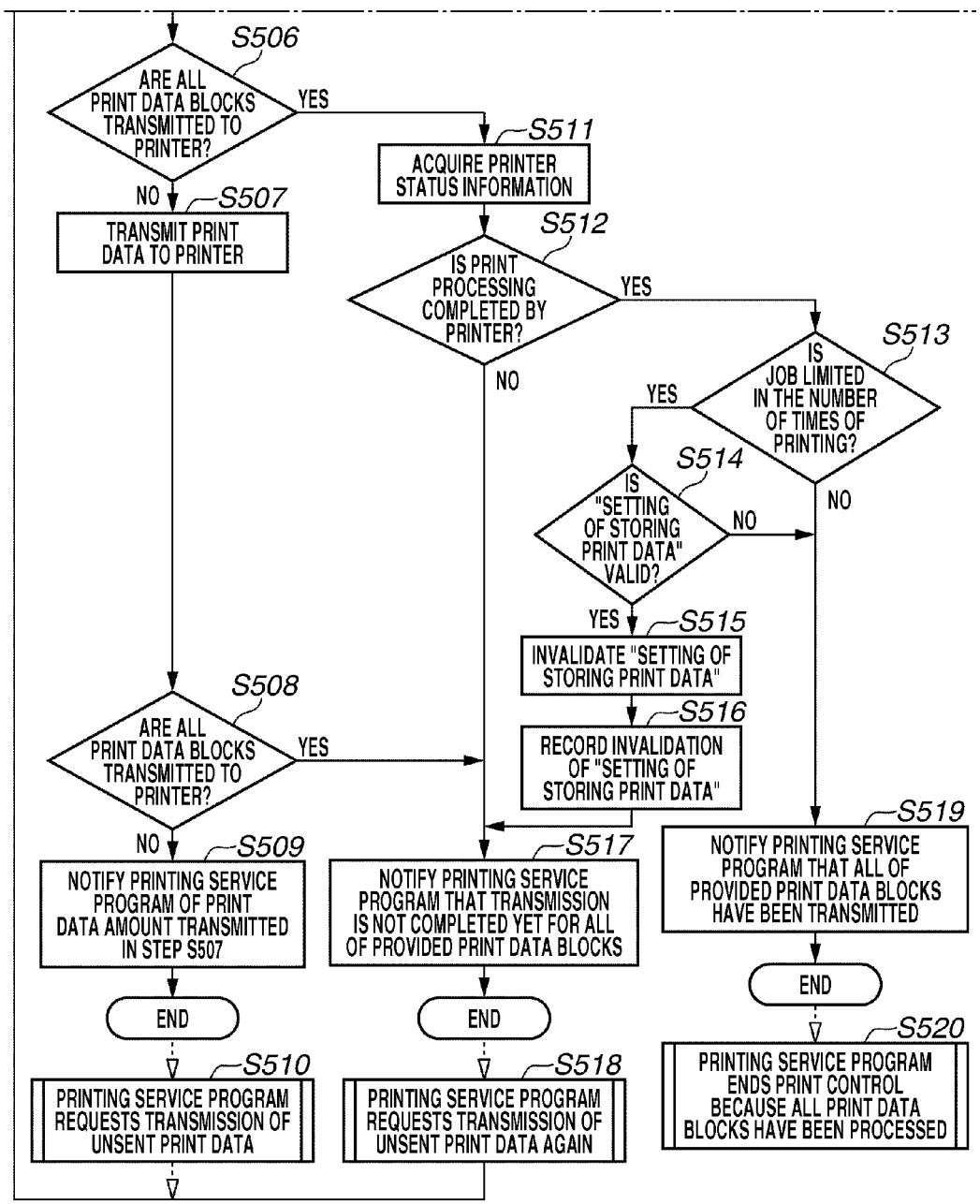

A third exemplary embodiment is configured in such a manner that the data transmission/reception control program 144 does not stop transmission of print data while the printer 2 is printing the data. FIG. 8, which is composed of FIGS. 8A and 8B, is a flowchart illustrating print data transmission control and print control performed by the data transmission/reception control program 144 according to the third exemplary embodiment.

In the third exemplary embodiment, the data transmission/reception control program 144 acquires the information about the status of print data reception from the printing service program 1411, the status of print data transmission to the printer 2, and the status of a printing operation at the printer 2. The third exemplary embodiment is configured in such a manner that the data transmission/reception control program 144 restricts data transmission at the timing of completion of a printing operation at the printer 2 based on the acquired information.

As described above with reference to FIG. 2, upon execution of print processing from the application 142, the printing service program 1411 requests the data transmission/reception control program 144 to transmit the generated print data. In step S501, the data transmission/reception control program 144 receives the print data that the data transmission/reception control program 144 should transmit.

In step S502, the data transmission/reception control program 144 checks whether the print job being currently processed is limited in the number of times of printing.

If the data transmission/reception control program 144 determines that the print job is limited in the number of times of printing (YES in step S502), the processing proceeds to step S506. If the print job is not limited in the number of times of printing (NO in step S502), the processing proceeds to step S503. In step S503, the data transmission/reception control program 144 checks whether "the setting of storing print data" has been invalidated in the previous print job. At this time, the data transmission/reception control program 144 determines whether "the setting of storing print data" has been changed by referring to "setting change information" stored in step S515 which will be described below. If the data transmission/reception control program 144 determines that "the setting of storing print data" has not been changed in the previous print job (NO in step S503), the processing proceeds to step S506. If "the setting of storing print data" has been changed in the previous print job (YES in step S503), the processing proceeds to step S504, in which the data transmission/reception control program 144 returns "the setting of storing print data" to a valid state. If the data transmission/reception control program 144 returns the setting to a valid state, in step S505, the data transmission/reception control program 144 deletes the stored "setting change information".

In step S506, the data transmission/reception control program 144 determines whether all the print data blocks have already been transmitted to the printer 2. For example, the data transmission/reception control program 144 analyzes the print data illustrated in FIG. 4, and determines that all the print data blocks have already been transmitted to the printer 2 if the end command 33 has been transmitted to the printer 2.

If the data transmission/reception control program 144 determines that the transmission to the printer 2 has not yet been completed for all the print data blocks (NO in step S506), the processing proceeds to step S507, in which the data transmission/reception control program 144 transmits the print data received from the printing service program 1411 to the printer 2. After the transmission, in step S508, the data transmission/reception control program 144 checks again whether all the print data blocks have been transmitted to the printer 2. If the transmission to the printer 2 has not yet been completed for all the print data blocks (NO in step S508), in step S509, the data transmission/reception control program 144 notifies the printing service program 1411 of the print data amount that has been transmitted in step S507, and then ends the processing. In step S510, in response to this notification, the printing service program 1411 requests the data transmission/reception control program 144 to transmit unsent print data.

On the other hand, if the data transmission/reception control program 144 determines that all the print data blocks have been transmitted to the printer 2 in step S508 (YES in step S508), the processing proceeds to step S517. In step S517, the data transmission/reception control program 144 notifies the printing service program 141 that the transmission to the printer 2 has not been completed yet for all of the print data blocks provided in step S501, and then ends the processing. As described above with reference to FIG. 2, in step S518, upon receiving this notification, the printing service program 1411 requests the data transmission/reception control program 144 to retransmit the unsent print data (the last data block among all the print data blocks of the print data received in step S501). The purpose of this process is to cause the processing proceeds from step S506 to step S511 in the next transmission request.

The processes of steps S506 and S508 are examples of a process of determining transmission completion.

If the data transmission/reception control program 144 determines that all the print data blocks have been transmitted to the printer 2 in step S506 (YES in step S506), in step S511, the data transmission/reception control program 144 acquires the status information including information indicating the status of print processing at the printer 2 via the input/output interface 19.

In step S512, the data transmission/reception control program 144 determines the status of the print processing at the printer 2 from the acquired status information. The process of step S512 is an example of a process of determining print completion. If the data transmission/reception control program 144 determines that the print processing has not been completed yet (NO in step S512), the processing proceeds to step S517. In step S517, the data transmission/reception control program 144 notifies the printing service program 1411 that the transmission has not been completed yet. The data transmission/reception control program 144 issues this notification to receive a transmission request of the same print data (the last data block among all the print data blocks of the print data received in step S501) in the next transmission request. The purpose of this process is to prevent the printing service program 1411 from ending the print control until the print processing is completed at the printer 2. Until the print processing is completed at the printer 2, the processes of steps S506, S511, S517, and S518 are repeated, and the printing service program 1411 cannot end the print control since the transmission has not been completed yet for all the print data blocks.

If the data transmission/reception control program 144 determines that the print processing has been already completed at the printer 2 (YES in step S512), in step S513, the data transmission/reception control program 144 checks whether the print job being currently processed is limited in the number of times of printing. If the print job is limited in the number of times of printing (YES in step S513), in step S514, the data transmission/reception control program 144 further checks "the setting of storing print data". If the data transmission/reception control program 144 confirms that the print job is not limited in the number of times of printing in step S513 (NO in step S513), or that "the setting of storing print data" is invalid although the print job is limited in the number of times of printing in step S514 (NO in step S514), the processing proceeds to step S519. In step S519, the data transmission/reception control program 144 notifies the printing service program 1411 that all the print data blocks provided in step S501 have been transmitted, and then ends the processing. In step S520, upon receiving this notification, the printing service program 1411 determines that all the print data blocks have been already transmitted to the printer 2, and, therefore, the printing service program 1411 deletes the print data, and ends the print control, as described above with reference to FIG. 2.

On the other hand, if the data transmission/reception control program 144 determines that the print job is limited in the number of times of printing in step S513 (YES in step S513) and that "the setting of storing print data" is valid in step S514 (YES in step S514), in step S515, the data transmission/reception control program 144 invalidates "the setting of storing print data". Further, in step S516, the data transmission/reception control program 144 records this setting change as "the setting change information". After that, in step S517, the data transmission/reception control program 144 notifies the printing service program 1411 that the transmission cannot be completed for all the print data blocks provided in step S501, and then ends the processing. In step S518, upon receiving this notification, the printing service program 1411 requests again the data transmission/reception control program 144 to retransmit the same print data.

As a result, even after the print processing has been completed at the printer 2, the printing service program 1411 cannot end the print control, and, therefore, it becomes impossible to read out the print data to reuse it.

According to the third exemplary embodiment, the data transmission is stopped after the print processing has been completed at the printer 2, and therefore, it can be prevented that the data transmission is stopped in the middle of the print processing at the printer 2. As a result, it is possible to avoid stopping of the data transmission as mentioned above while preventing the print data from being reused when the print job is limited in the number of times of printing and "the setting of storing print data" is valid.

In the third exemplary embodiment, "the setting of storing print data" is automatically changed in step S515. However, the third exemplary embodiment may be configured to notify a user of the setting change, as is the case with the first and second exemplary embodiments. Alternatively, the third exemplary embodiment may be configured to automatically cancel a print job without notifying a user thereof.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-084654 filed Apr. 6, 2011, which is hereby incorporated by reference herein in its entirety.

What is claimed is:

1. An information processing apparatus comprising:
   a determination unit configured to determine whether print data is limited in a number of times of printing;
   a setting determination unit configured to determine whether a setting to store the print data in the information processing apparatus is valid
   a display control unit configured to display a screen in a case where the determination unit determines that the print data is limited in the number of times of printing and the setting determination unit determines that the setting is valid;
   a control unit configured to stop processing of the print data in a case where cancellation of printing is selected in the screen wherein a message indicating that the setting to store the print data is valid as a reason to stop processing of the print data is displayed in the screen; and
   a processor, coupled to a memory, configured to control at least one of the determination unit, the setting determination unit and the control unit.

2. The information processing apparatus according to claim 1, wherein the determination unit determines that the print data is limited in the number of times of printing in a case where number of times of printing limitation information, which is included in the print data and indicates whether the print data is limited in the number of times of printing, indicates that the print data is limited in the number of times of printing.

3. The information processing apparatus according to claim 1, wherein the setting determination unit determines that the setting is valid in a case where a type of a port for processing the print data to a printing apparatus is a file port, and the setting determination unit determines that the setting is invalid in a case where the type of the port is not a file port.

4. The information processing apparatus according to claim 1, wherein the processor is further configured to control:
   a transmission completion determination unit configured to determine whether all print data blocks have been transmitted to a printing apparatus based on an end command included in the print data; and
   a printing completion determination unit configured to determine whether printing has been completed based on status information acquired from the printing apparatus,
   wherein the display control unit displays the screen in a case where the transmission completion determination unit determines that all the print data blocks have been transmitted to the printing apparatus, the printing completion determination unit determines that the printing has been completed at the printing apparatus, the determination unit determines that the print data is limited in the number of times of printing, and the setting determination unit determines that the setting is valid.

5. An information processing method performed by an information processing apparatus, the information processing method comprising:
   determining whether print data is limited in a number of times of printing;
   determining whether a setting to store the print data in the information processing apparatus is valid;
   displaying a screen in a case where it is determined that the print data is limited in the number of times of printing and it is determined that the setting is valid; and
   stopping processing of the print data in a case where cancellation of printing is selected in the screen where a message indicating that the setting to store the print data is valid as a reason to stop processing of the print data is displayed in the screen.

6. The information processing method according to claim 5, further comprising determining that the setting is valid in a case where a type of a port for transmitting the print data to a printing apparatus is a file port, and determining that the setting is invalid in a case where the type of the port is not a file port.

7. The information processing method according to claim 5, further comprising:
   determining whether all print data blocks have been transmitted to a printing apparatus based on an end command included in the print data;
   determining whether printing has been completed based on status information acquired from the printing apparatus; and
   stopping the processing of the print data in a case where it is determined that all the print data blocks have been transmitted to the printing apparatus, it is determined that the printing has been completed at the printing apparatus, it is determined that the print data is limited in the number of times of printing, and it is determined that the setting is valid.

8. A non-transitory computer-readable storage medium storing a program for causing a computer to execute a method, the method comprising:
- determining whether print data is limited in a number of times of printing;
- determining whether a setting to store the print data in the information processing apparatus is valid;
- displaying a screen in a case where it is determined that the print data is limited in the number of times of printing and it is determined that the setting is valid; and
- stopping processing of the print data in a case where cancellation of printing is selected in the screen where a message indicating that the setting to store the print data is valid as a reason to stop processing of the print data is displayed in the screen.

9. The non-transitory computer-readable storage medium according to claim 8, wherein the method further comprises determining that the setting is valid in a case where a type of a port for transmitting the print data to a printing apparatus is a file port, and determining that the setting is invalid in a case where the type of the port is not a file port.

10. The non-transitory computer-readable storage medium according to claim 8, wherein the method further comprises:
- determining whether all print data blocks have been transmitted to a printing apparatus based on an end command included in the print data;
- determining whether printing has been completed based on status information acquired from the printing apparatus; and
- stopping the transmission of the print data in a case where it is determined that all the print data blocks have been transmitted to the printing apparatus, it is determined that the printing has been completed at the printing apparatus, it is determined that the print data is limited in the number of times of printing, and it is determined that the setting is valid.

11. The information processing apparatus according to claim 1, wherein the processing of the print data which has been stopped by the control unit is executed in a case where the setting of storing the print data is invalidated after the processing of the print data was stopped.

12. The information processing method according to claim 5, further comprising:
- executing the transmission of the print data which has been stopped, in a case where the setting of storing the print data is invalidated after the transmission of the print data was stopped.

13. The information processing method according to claim 5, further comprising:
- displaying a message indicating invalidation of the setting of storing the print data, in a case that the print data is limited in a number of times of printing and it is determined that the setting is valid.

14. The non-transitory computer-readable storage medium according to claim 8, wherein the method further comprises:
- executing the transmission of the print data which has been stopped, in a case where the setting of storing the print data is invalidated after the transmission of the print data was stopped.

15. The non-transitory computer-readable storage medium according to claim 8, wherein the method further comprises:
- displaying a message indicating invalidation of the setting of storing the print data, in a case that the print data is limited in a number of times of printing and it is determined that the setting is valid.

* * * * *